(12) United States Patent
Saito

(10) Patent No.: US 7,805,760 B2
(45) Date of Patent: Sep. 28, 2010

(54) DATA PROCESSING METHOD, DATA PROCESSING DEVICE COMPUTER PROGRAM AND RECORDING MEDIUM

(75) Inventor: Kazunori Saito, Osaka (JP)

(73) Assignee: Secure Ware Inc., Osaka (JP)

( * ) Notice: Subject to any disclaimer, the term of this patent is extended or adjusted under 35 U.S.C. 154(b) by 977 days.

(21) Appl. No.: 10/523,690

(22) PCT Filed: Aug. 4, 2003

(86) PCT No.: PCT/JP03/09894

§ 371 (c)(1),
(2), (4) Date: Feb. 3, 2005

(87) PCT Pub. No.: WO2004/013755

PCT Pub. Date: Feb. 12, 2004

(65) Prior Publication Data

US 2006/0041863 A1    Feb. 23, 2006

(30) Foreign Application Priority Data

Aug. 5, 2002    (JP) .............................. 2002-227888

(51) Int. Cl.
G06F 11/00 (2006.01)
G06F 9/44 (2006.01)
G06F 11/30 (2006.01)
(52) U.S. Cl. .................... 726/24; 726/22; 717/124; 717/133; 713/187
(58) Field of Classification Search ............. 726/22–25; 717/124–129, 131–135; 713/187–188
See application file for complete search history.

(56) References Cited

U.S. PATENT DOCUMENTS 5,313,616 A * 5/1994 Cline et al. ................. 717/127
6,148,437 A * 11/2000 Shah et al. .................. 717/128

(Continued)

FOREIGN PATENT DOCUMENTS

JP    09-128264 A * 5/1997

(Continued)

OTHER PUBLICATIONS

Baratloo, A. et al. "Transparent Run-Time Defense Against Stack Smashing Attacks." USENIX Annual Technical Conference, pp. 251-262, Berkeley, CA, Jun. 2000.*

(Continued)

Primary Examiner—Kimyen Vu
Assistant Examiner—Darren Schwartz
(74) Attorney, Agent, or Firm—Birch, Stewart, Kolasch & Birch, LLP.

(57) ABSTRACT

The branch origin address and branch destination address of a branch instruction (jmp instruction) are stored, a judgment is made as to whether or not a call instruction for calling an instruction code group for executing an external command is associated with the branch destination address, a judgment is made as to whether or not the call destination address is between the branch origin address and the branch destination address if the call instruction is associated with the branch destination address, and information indicating that malicious code was detected is generated if the call destination of the call instruction is between the branch origin address and the branch destination address.

6 Claims, 9 Drawing Sheets

U.S. PATENT DOCUMENTS

| | | | |
|---|---|---|---|
| 6,301,699 B1 * | 10/2001 | Hollander et al. | 717/131 |
| 6,697,950 B1 * | 2/2004 | Ko | 726/24 |
| 6,775,780 B1 * | 8/2004 | Muttik | 726/24 |
| 7,340,777 B1 * | 3/2008 | Szor | 726/26 |
| 2001/0011346 A1 * | 8/2001 | Yoshimi | 712/239 |
| 2002/0083334 A1 * | 6/2002 | Rogers et al. | 713/200 |
| 2003/0041315 A1 * | 2/2003 | Bates et al. | 717/129 |

FOREIGN PATENT DOCUMENTS

| | | | |
|---|---|---|---|
| JP | 09128264 A | * | 5/1997 |

OTHER PUBLICATIONS

Part 3, Inspecting packet data by use of iptables extension modules, Warm/Virus Attack Strategy, Advanced Level, written by Nanami Futa, published by Linux World, Japan, IDG Japan Co., Ltd.

Edited by Suguru Yamaguchi, 'Joho Security', first edition, Kyoritsu Shuppan Co., Ltd., (JP), Sep. 20, 2000, pp. 150-161.

Written by Gakuto Masuda, 'Computer Virus', first edition, Kabushiki Kaisha SCC, (JP), Jan. 16, 2000, pp. 108-110.

Written by Palevich, J., translated by Makino, "E-Mail from View Dai 31 Kai Computer Virus no Subete", ASCII DOS/V Issue, (JP), Sep. 1, 1999, pp. 124-125.

"Ichi kara manabu Linux security, the 5th, remote buffer overflow attack"; Nikkei Linux, vol. 4, Issue No. 8, Aug. 8, 2002, pp. 105-112.

* cited by examiner

DATA PROCESSING METHOD, DATA PROCESSING DEVICE COMPUTER PROGRAM AND RECORDING MEDIUM

This application is the national phase under 35 U.S.C. §371 of PCT International Application No. PCT/JP03/09894 which has an International filing date of Aug. 4, 2003, which designated the United States of America.

TECHNICAL FIELD

The present invention relates to a data processing method and a data processor for detecting data that executes a malicious process, a computer program for realizing the data processor, and a computer-readable memory product storing the computer program.

BACKGROUND ART

With the spread of Internet networks, various information processors are subjected to computer virus and cracking attacks, and there is an increasing possibility that the information processors are threatened by these attacks.

For example, recently, computer viruses such as "Nimuda" and "CodeRed" spread itself using the vulnerability (security holes) of application programs such as system programs or web browsers, and caused considerable damage.

In the above-mentioned computer viruses and cracking attacks, attack data containing an instruction code to perform a malicious process (hereinafter referred to as the malicious code) is sent to information processors such as servers and personal computers subjected to the attacks, and the instruction code is executed in the information processors. As such an attacking technique, a variety of techniques exist, and one known example is an attacking technique using a buffer overflow. With a buffer overflow attack, in a buffer ensured for a stack, writing is performed in a stack area exceeding the ensured buffer, and when an information processor falls in a buffer overflow condition, an unexpected variable breakdown occurs and may cause an erroneous operation of the program. The buffer overflow attack intentionally causes an erroneous operation of the program and, for example, acquires the administrative right of the system.

In order to deal with these computer virus and cracking attacks, a conventional technique detects whether or not received data contains a specific bit pattern which is seen in malicious code. If the received data contains such a bit pattern, the received data is judged to be attack data containing malicious code, and the process for blocking reception of the data and informing the user of the fact is performed.

Thus, in order to deal with various computer virus and cracking attacks with the conventional technique, it is necessary to store specific bit patterns corresponding to respective computer viruses and cracking in a database in advance, and, when new types of computer viruses and cracking techniques are discovered, the database must be updated to deal with them.

By the say, in a conventional method of detecting attack data, a known bit pattern is detected as described above, or the structure of nonessential portion such as simple repetitions of NOP instructions (NOP: non-operation) of the attacking process is detected. Therefore, the conventional detection method is weak against a variation of attack data, requires an update of the database of bit patterns used for detection whenever unknown attack data appears, and has the problem of time lug until the database is updated.

DISCLOSURE OF THE INVENTION

The present invention has been made with the aim of solving the above problems, and it is an object of the present invention to provide a data processing method and a data processor which are capable of eliminating the necessity of preparing bit patterns for the detection of an instruction code group that performs a malicious process and capable of detecting an unknown instruction code group that performs a malicious process, by retrieving an instruction code related to a branch instruction from input data, judging whether or not an instruction code for calling an instruction code group for executing a predetermined process is associated with a branch destination address, and judging whether or not a call destination address of the instruction code is between the branch origin address and the branch destination address if the instruction code is associated with the branch destination address, and to provide a computer program for realizing the data processor, and a computer-readable memory product storing the computer program.

A data processing method according to a first aspect of the invention is a data processing method including receiving input data containing a plurality of instruction codes, and judging whether or not a process executed based on the instruction codes contained in the received data is a malicious process, and characterized by comprising: retrieving an instruction code related to a branch instruction from the data; storing a branch origin address associated with the retrieved instruction code and a branch destination address associated with a branch destination of the instruction code; judging whether or not an instruction code for calling an instruction code group for executing a predetermined process is associated with the branch destination address; storing a call destination address of the instruction code if the instruction code is associated with the branch destination address; and judging whether or not the stored call destination address is between the branch origin address and the branch destination address.

A data processor according to a second aspect of the invention is a data processor including means for receiving input data containing a plurality of instruction codes, for judging whether or not a process executed based on the instruction codes contained in the received data is a malicious process, and characterized by comprising: means for retrieving an instruction code related to a branch instruction from the data; means for storing a branch origin address associated with the retrieved instruction code and a branch destination address associated with a branch destination of the instruction code; means for judging whether or not an instruction code for calling an instruction code group for executing a predetermined process is associated with the branch destination address; means for storing a call destination address of the instruction code if the instruction code is associated with the branch destination address; means for judging whether or not the stored call destination address is between the branch origin address and the branch destination address; and means for outputting information indicating that the data is data for executing a malicious process if the call destination address is between the branch origin address and the branch destination address.

A data processor according to a third aspect of the invention is based on the data processor of the second aspect, and characterized by further comprising means for judging whether or not a predetermined character string is associated with a return address of the instruction code group, wherein if the character string is associated with the return address, the information indicating that the data is data for executing a malicious process is outputted.

A data processor according to a fourth aspect of the invention is a data processor including means for receiving input data containing a plurality of instruction codes, for judging whether or not a process executed based on the instruction codes contained in the data received by the means is a malicious process, and characterized by comprising: means for retrieving an instruction code for calling an instruction code group for executing a predetermined process from the data; means for judging whether or not a predetermined character string is associated with a return address of the instruction code group; and means for outputting information indicating that the data is data for executing a malicious process if the character string is associated with the return address.

A data processor according to a fifth aspect of the invention is a data processor including means for receiving input data containing a plurality of instruction codes, for judging whether or not a process executed based on the instruction codes contained in the data received by the means is a malicious process, and characterized by comprising: means for retrieving an instruction code for calling an instruction code group for executing a predetermined process from the data; means for judging whether or not an instruction code for obtaining a return address of the instruction code group is contained in the instruction code group if the instruction code is retrieved; and means for outputting information indicating that the data is data for executing a malicious process if the instruction code is contained in the instruction code group.

A computer program according to a sixth aspect of the invention is computer program including a step of causing a computer to judge whether or not a process executed based on input data containing a plurality of instruction codes is a malicious process, and characterized by comprising: a step of causing the computer to retrieve an instruction code related to a branch instruction from the data; a step of causing the computer to store a branch origin address associated with the retrieved instruction code and a branch destination address associated with a branch destination of the instruction code; a step of causing the computer to judge whether or not an instruction code for calling an instruction code group for executing a predetermined process is associated with the branch destination address; a step of causing the computer to store a call destination address of the instruction code if the instruction code is associated with the branch destination address; and a step of causing the computer to judge whether or not the stored call destination address is between the branch origin address and the branch destination address.

A computer-readable memory product according to a seventh aspect of the invention is a computer-readable memory product storing a computer program including a step of causing a computer to judge whether or not a process executed based on input data containing a plurality of instruction codes is a malicious process, and characterized in that the stored computer program comprises: a step of causing the computer to retrieve an instruction code related to a branch instruction from the data; a step of causing the computer to store a branch origin address associated with the retrieved instruction code and a branch destination address associated with a branch destination of the instruction code; a step of causing the computer to judge whether or not an instruction code for calling an instruction code group for executing a predetermined process is associated with the branch destination address; a step of causing the computer to store a call destination address of the instruction code if the instruction code is associated with the branch destination address; and a step of causing the computer to judge whether or not the stored call destination address is between the branch origin address and the branch destination address.

According to the first, second, sixth and seventh aspects of the invention, an instruction code related to a branch instruction is retrieved from input data, the branch origin address and branch destination address of the retrieved instruction code are stored, a judgment is made as to whether or not an instruction code for calling an instruction code group for executing a predetermined process is associated with the branch destination address, a call destination address of the instruction code is stored if the instruction code is associated with the branch destination address, and a judgment is made as to whether or not the stored call destination address is between the branch origin address and the branch destination address. Thus, since the present invention pays attention to universal structures which are not seen in usual data (execution code), even when malicious code is modified, there is a high possibility that the modified malicious code will be detected, and even when unknown attack data appears, it is possible to find the malicious code unless the substantial process of malicious code is changed. Moreover, since a judgment as to whether or not data is malicious code can be made by consecutively reading instruction codes, the processing speed is fast, and, for example, it is possible to judge data received by communication in real time.

According to the third aspect of the invention, since the data processor further comprises means for judging whether or not a predetermined character string is associated with a return address of an instruction code group, the malicious code detection accuracy is improved.

According to the fourth aspect of the invention, since the data processor retrieves an instruction code for calling an instruction code group for executing a predetermined process from input data and judges whether or not a predetermined character string is associated with a return address of the instruction code group, it is possible to easily and accurately judge whether or not the data is malicious code.

According to the fifth aspect of the invention, since the data processor retrieves an instruction code for calling an instruction code group for executing a predetermined process from input data and judges whether or not an instruction code for obtaining a return address is contained in the instruction code group if the instruction code is retrieved, it is possible to easily and accurately judge whether or not the data is malicious code.

BEST MODE FOR CARRYING OUT THE INVENTION

The following description will specifically explain the present invention, based on the drawings illustrating some embodiments thereof.

Embodiment 1

Figure 1:
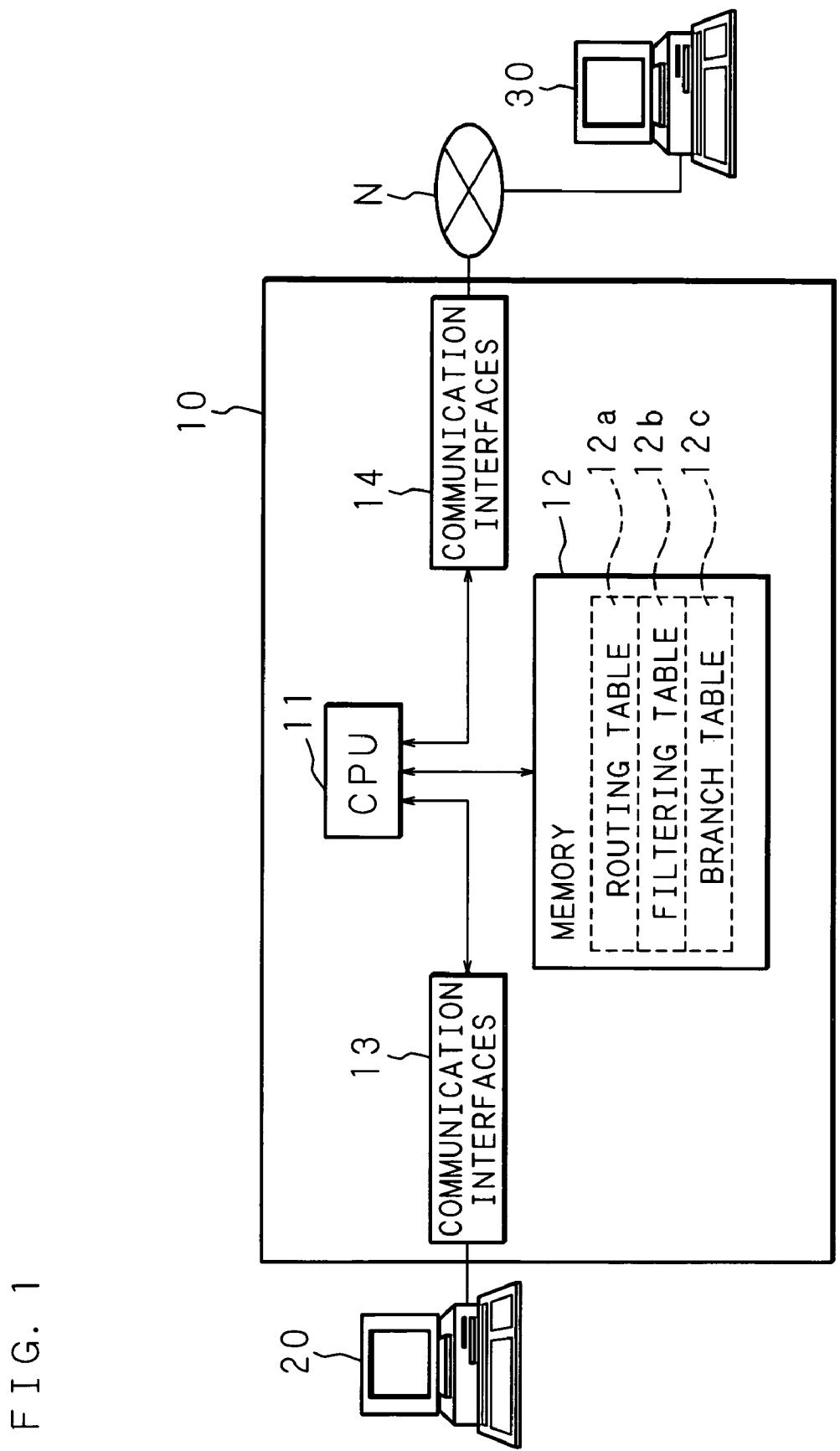
FIG. 1 is a schematic block diagram for explaining an intrusion detection system using a data processor of the present invention.

FIG. 1 is a schematic block diagram for explaining an intrusion detection system using a data processor of the present invention. In FIG. 1, the reference numeral 10 represents a relay device that is an embodiment of a data processor of the present invention, and, for example, is a device such as a router, a switch and a broadband router that relays data communication. The relay device 10 comprises a CPU 11, a memory 12, and communication interfaces (hereinafter referred to as the communication IF) 13, 14, and relays the sending and receiving of various data between an information processor 20 connected to the communication IF 13 and other information processor 30 connected to the communication IF 14 through a data communication network N such as the Internet network. For example, the information processors 20 and 30 are apparatuses such as personal computers, servers, mobile phones, and PDA (Personal Digital Assistant) that can perform data communications.

When the relay device 10 receives data sent from the information processor 30, it judges whether or not the received data is data containing an instruction code that performs a malicious process (hereinafter referred to as malicious code). If the received data contains malicious code, the relay device 10 performs the processes of cutting off the communication, and outputting a warning.

The memory 12 of the relay device 10 includes a routing table 12a, a filtering table 12b, and a branch table 12c.

Communication route control information is stored in the routing table 12a, and a transmission route of data sent from the information processor 20 is determined by the route control information. Identification information (for example, IP addresses or port numbers) of senders to be blocked is stored in the filtering table 12b, and when data is received from an information processor corresponding to the identification information, the relay device 10 does not send the data to the information processor 20.

Moreover, a computer program of the present invention is pre-stored in the memory 12, and, when the CPU 11 executes the computer program, the relay device 10 operates as an intrusion detection system for detecting malicious code. In the branch table 12c, the memory address (hereinafter simply referred to as the address) related to a specific instruction code obtained while the computer program is active is stored, and used when judging whether or not the received data is data containing malicious code.

The CPU 11 of the relay device 10 controls communications by appropriately performing writing and reading with respect to these tables.

The following description will explain the characteristic structures of malicious code which were found based on the knowledge of the present inventor, etc. The present inventor, etc. found as universal structures of malicious code that a call instruction is set in a branch destination specified by a branch instruction (hereinafter referred to as a jmp instruction), and the call destination is between the jmp instruction and the call instruction. Further, an address stored in a stack by the call instruction, namely, the next address of the call instruction is obtained from an instruction code group in the call destination, and a command desired to be activated is executed using the obtained address.

Figure 2:
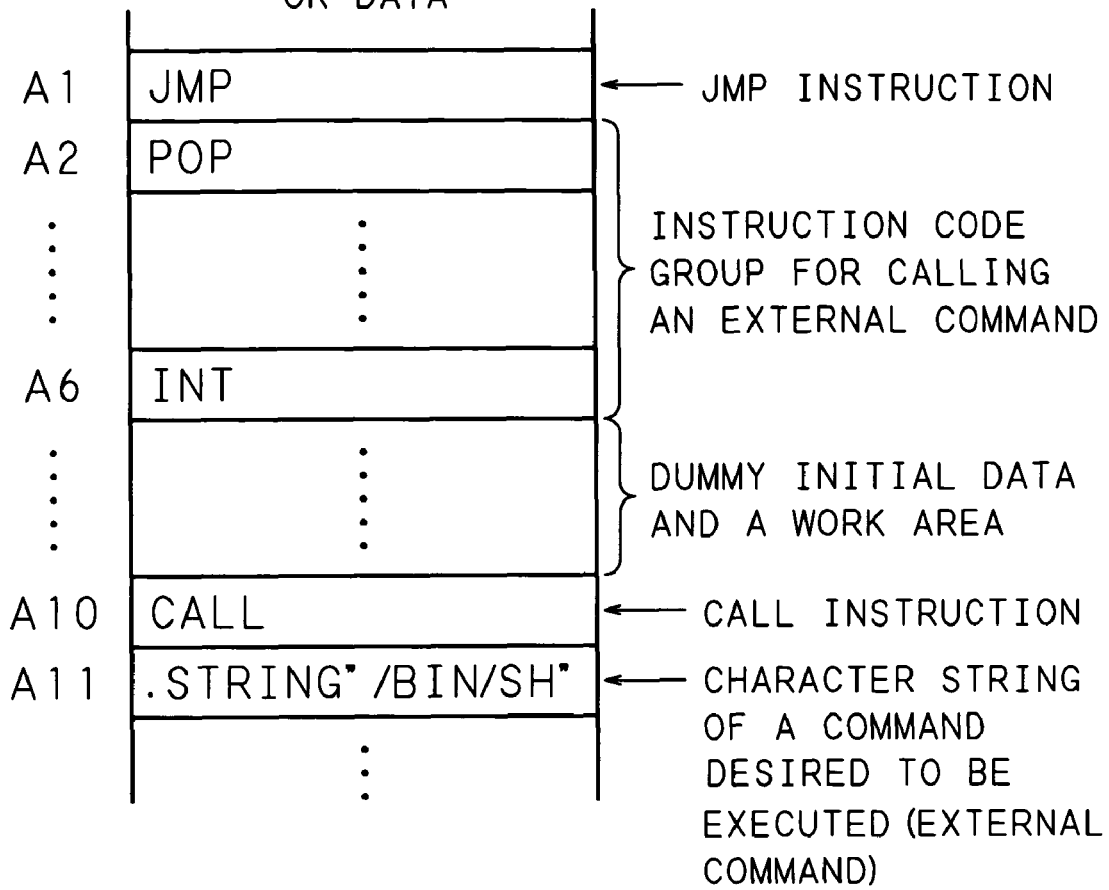
FIG. 2 is a concept view for explaining the characteristic structures of malicious code.
Figure 3:
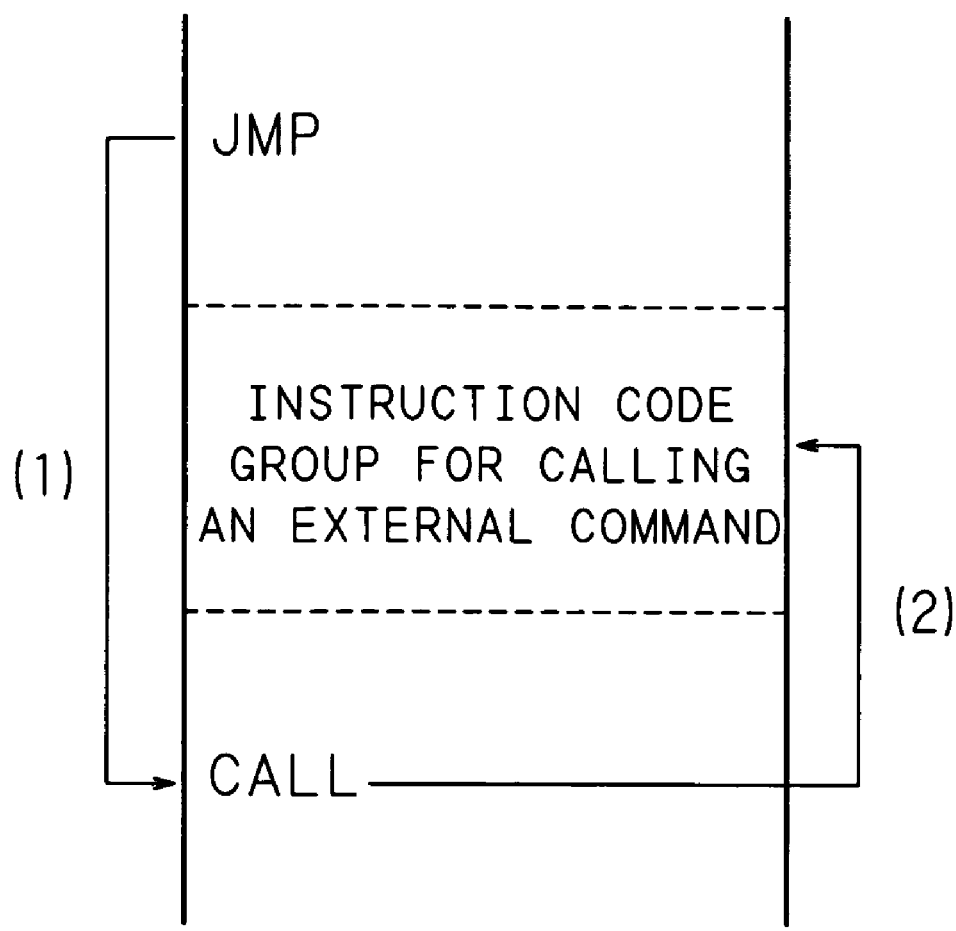
FIG. 3 is a concept view for explaining the characteristic structures of malicious code.

FIGS. 2 and 3 are concept views for explaining the characteristic structures of malicious code. As described above, a call instruction is set in association with a branch destination of a jmp instruction for branching the processing. In other words, a call instruction is provided to correspond to a branch destination address (A10) of the jmp instruction.

Further, an instruction code group (A2 to A6) for calling an external command is associated with the call destination of the call instruction, and the call destination of the call instruction is set between the branch origin address (A1) and the branch destination address (A10). With this instruction code group, an address stored in a stack by the call instruction, namely, the next address (A11) of the call instruction is obtained by a pop instruction, and the external command is executed using the obtained address.

Thus, by associating an arbitrary external command intended by the creator of malicious code with the next address of the call command, the external command is called and executed when the instruction codes are executed.

Note that it may, of course, be possible to provide dummy initial data and a work area between the instruction code group and the call instruction (at A7 through A9).

As schematically shown in FIG. 3, the malicious code is characterized by (1) the existence of the call instruction at the branch destination of the jmp instruction, and (2) the existence of the call destination of the call instruction between the call instruction and the jmp instruction.

The relay device 10 detects malicious code having such characteristic structures from data received by the communication IF 14, and then outputs a warning, or cuts off the communication.

Figure 4:
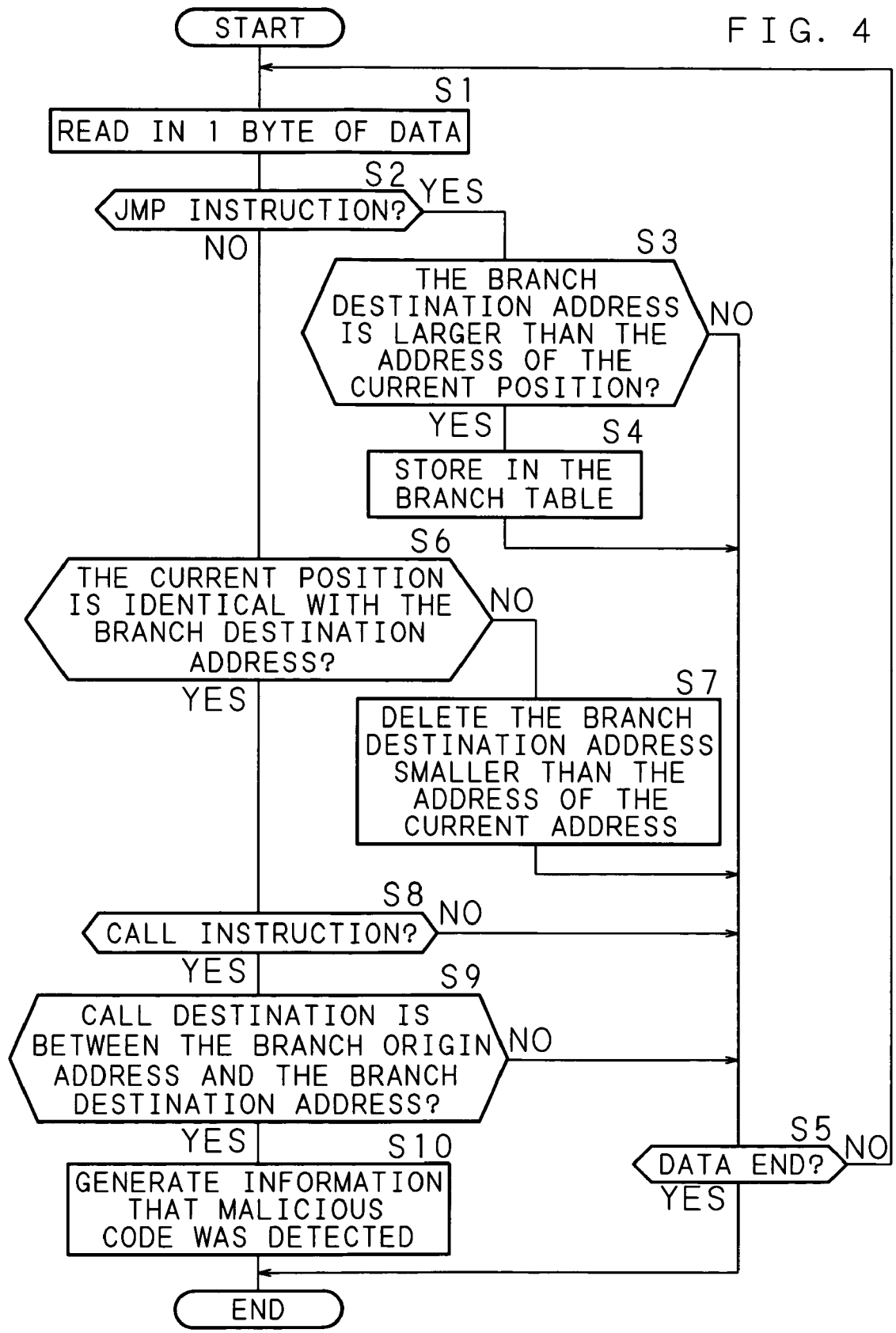
FIG. 4 is a flowchart for explaining the processing steps performed by an intrusion detection system according to an embodiment.
Figure 5:
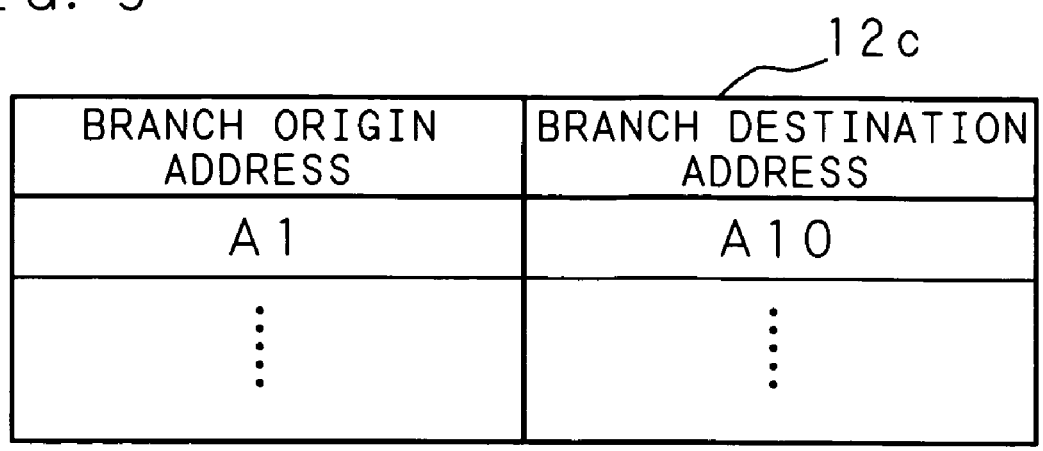
FIG. 5 is a concept view showing one example of a branch table used for intrusion detection.

The following description will explain the procedure of detecting malicious code having the above-mentioned characteristic structures. FIG. 4 is a flowchart for explaining the processing steps performed by an intrusion detection system according to this embodiment, and FIG. 5 is a concept view showing one example of the branch table 12c used for intrusion detection. First, the CPU 11 of the relay device 10 reads one byte of data received by the communication IF 14 (step S1). Then, the CPU 11 judges whether or not the read data is a jmp instruction (step S2). If the read data is a jmp instruction (S2: YES), the CPU 11 judges whether or not the address of a branch destination specified by the jmp instruction is larger than the address of the current position (step S3).

If the address of the branch destination is larger than the address of the current position (S3: YES), the CPU 11 stores the address of the current position (branch origin address) and the address of the branch destination (branch destination address) in association with each other in the branch table 12c (step S4). In the data example shown in FIG. 2, when the data at the address A1 is read, since the data is a jmp instruction and the address (A10) of a branch destination specified by the jmp instruction is larger than the address A1, the A1 and A10 are stored as the branch origin address and the branch destination address, respectively, in the branch table 12c (see FIG. 5).

At step S3, if the branch destination address is judged smaller than the address of the current position (S3: NO), or when the branch origin address and the branch destination address were stored in the branch table 12c at step S4, the CPU 11 judges whether or not the data to be read comes to an end (step S5). If the CPU 11 judges that there is still data to be read (S5: NO), it returns the processing to step S1, or if the CPU 11 judges that the data to be read comes to an end (S5: YES), this routine is finished.

If the CPU 11 judges at step S2 that the read data is not a jmp instruction (S2: NO), it judges whether or not the address of the current position is identical with the branch destination address stored in the branch table 12c (step S6). If the address of the current position is not identical with the branch destination address (S6: NO), the CPU 11 deletes the branch destination address smaller than the address of the current address from the branch table 12c (step S7). Then, the CPU 11 performs the process of step S5 and judges whether it should return the processing to step S1 again, or complete the process of this routine.

If the address of the current position is identical with the branch destination address stored in the branch table 12c (S6: YES), then the CPU 11 judges whether or not the instruction code associated with the address of the current position is a call instruction (step S8). If the instruction code associated with the address of the current position is a call instruction (S8: YES), then the CPU 11 refers to the branch table 12c and judges whether or not the call destination of the call instruction is between the branch origin address and the branch destination address (step S9).

If the CPU 11 judges at step S8 that the instruction code associated with the address of the current position is not a call instruction (S8: NO), or judges at step S9 that the call destination is not between the branch origin address and the branch destination address (S9: NO), then it moves the processing to step S5.

If the call destination of the call instruction is between the branch origin address and the branch destination address (S9: YES), the CPU 11 generates information indicating that malicious code was detected (step S10).

The information indicating that malicious code was detected may be displayed by providing the relay device 10 with a display unit such as a liquid crystal display, or may be notified by providing the relay device 10 with a warning section such as a buzzer or an LED lamp. Further, the information may be sent to the information processor 20 and displayed on the display unit (not shown) of the information processor 20. In addition, it may also be possible to cut off the communication in response to the creation of the information indicating that malicious code was detected.

As described above, since a character string of an external command to be executed exists at the address stored in the stack by the call instruction, the malicious code detection accuracy can be improved by using the presence or absence of an ASCII character string (command name) at the next address of the call instruction as supporting evidence.

Moreover, it has also been known by the study of the present inventor, etc. that it is possible to detect the presence or absence of malicious code by solely making a judgment as to whether or not an ASCII character string exists at the next address of the call instruction.

Thus, in this embodiment, since a judgment as to whether or not malicious code is contained in data can be made by consecutively reading and processing data, the algorism for detecting the presence or absence of malicious code is simple, and high-speed processing is possible.

Embodiment 2

The above-mentioned malicious code is characterized in that an external command to be executed is placed at the next address of the call instruction, and, in Embodiment 1, the malicious code is detected by finding a special structure for calling such an external command. However, the external command to be executed is not necessarily placed next to the call instruction, and it may also be possible to place the external command at a position shifted by an amount of addresses predetermined by the creator of the malicious code. Such malicious code is called deceptive malicious code here, and the characteristic structures of deceptive malicious code and the detection procedure will be explained below. Note that since the structure of the relay device 10 and the connection structure of the relay device 10 to the information processors 20 and 30 are the same as in Embodiment 1, the explanations thereof are omitted.

Figure 6:
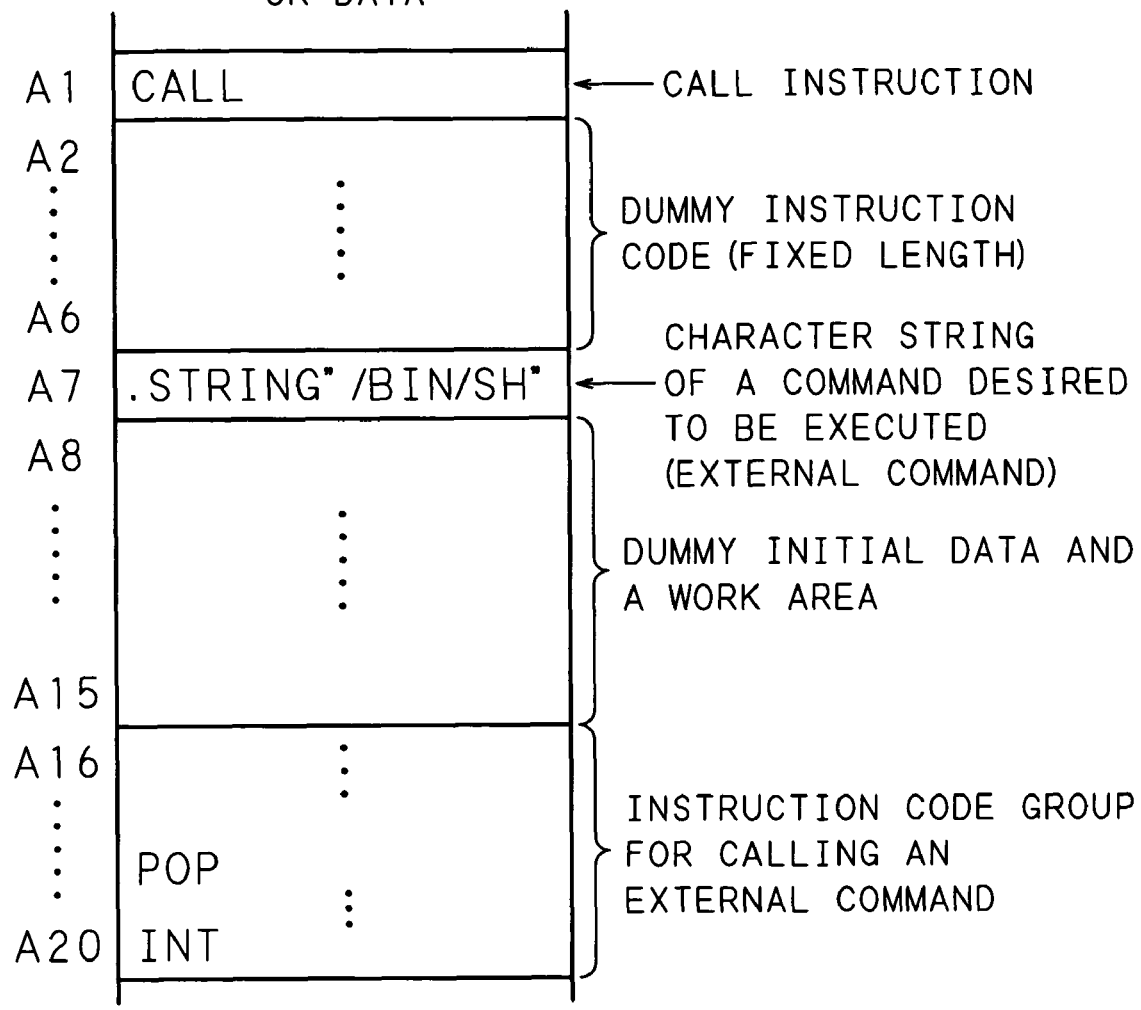
FIG. 6 is a concept view for explaining the characteristic structures of deceptive malicious code.
Figure 7:
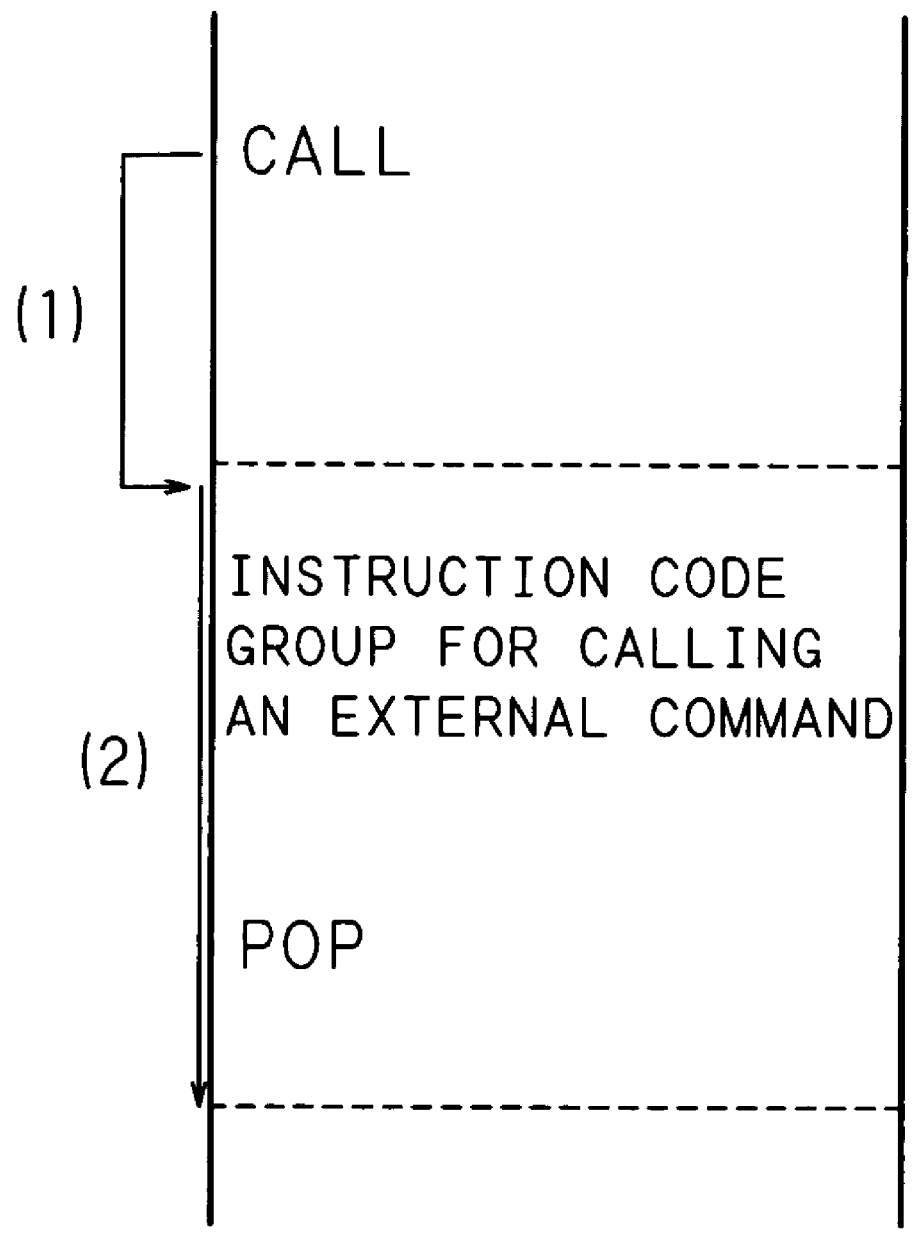
FIG. 7 is a concept view for explaining the characteristic structures of deceptive malicious code.

FIG. 6 and FIG. 7 are concept views for explaining the characteristic structures of deceptive malicious code. In the deceptive malicious code, similarly to the above, an address associated with an external command to be activated is obtained from an instruction code group called by a call instruction, but the deceptive malicious code differs from the malicious code explained in Embodiment 1 in that deception is made by placing dummy instruction code with a fixed length between the call instruction and the external command.

In other words, in the deceptive malicious code having the structure shown in FIG. 6, an address (A2) stored in a stack by the call instruction is obtained from an instruction code group defined at A16 through A20, and an external command associated with the fifth address (A7) from the address A2 is activated.

Such deceptive malicious code is not detectable by the processing explained in Embodiment 1, but as schematically shown in FIG. 7, it can be understood that the deceptive malicious code still has the characteristic structures: (1) calling an instruction code group by a call instruction, and (2) obtaining an address stored in a stack by the call instruction by a pop instruction in the instruction code group. Therefore, by retrieving a pop instruction with no preceding push instruction in the instruction code group called by the call instruction, it is possible to detect the deceptive malicious code.

The following description will explain the procedure for detecting deceptive malicious code.

Figure 8:
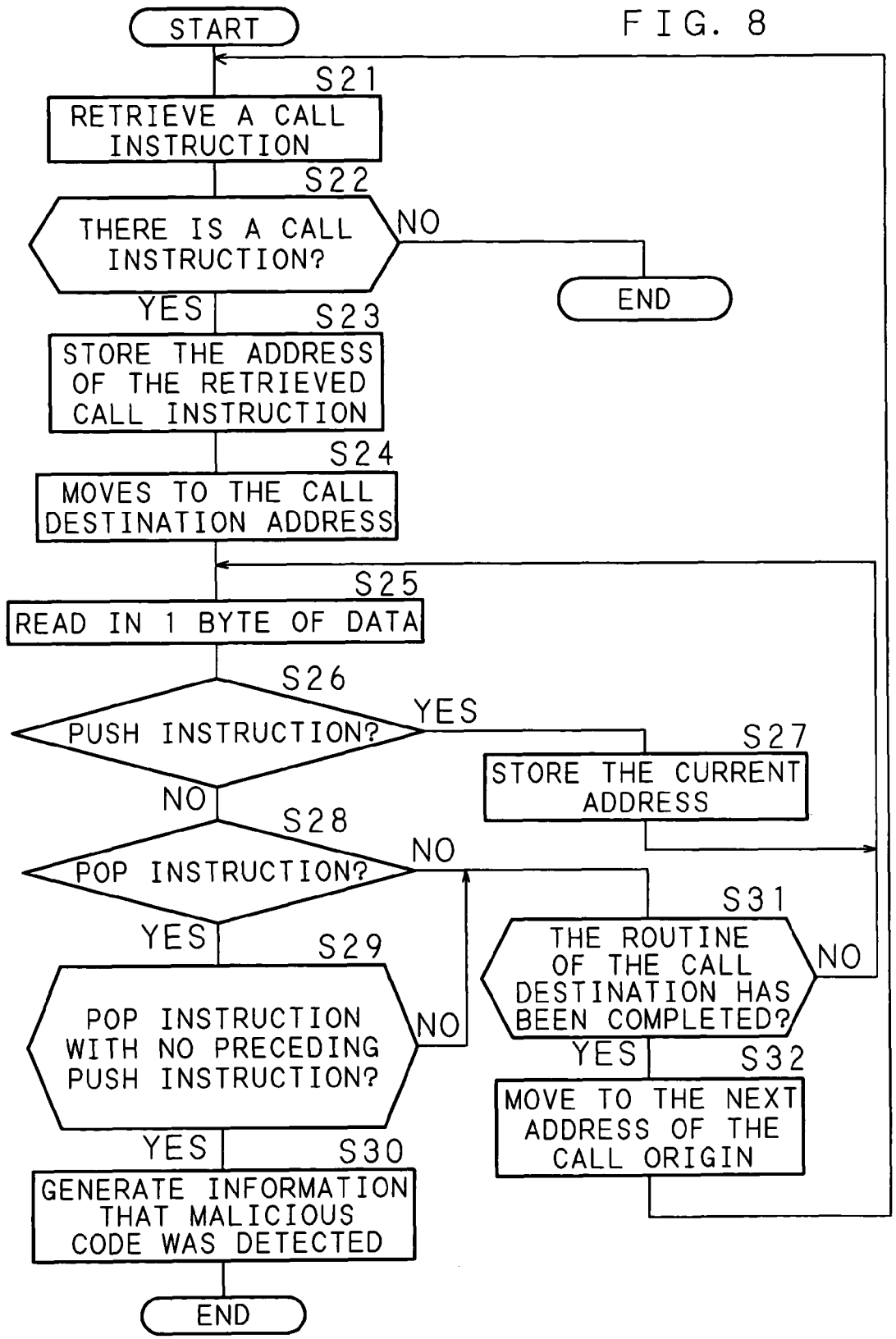
FIG. 8 is a flowchart for explaining the processing steps performed by an intrusion detection system according to an embodiment.

FIG. 8 is a flowchart for explaining the processing steps performed by an intrusion detection system according to this embodiment. First, the CPU 11 of the relay device 10 retrieves a call instruction from the received data (step S21). As a result of the retrieval, the CPU 11 judges whether or not there is a call instruction (step S22). If there is a call instruction (S22: YES), the CPU 11 stores the address of the retrieved call instruction in the memory 12 (step S23). If there is no call instruction in the received data (S22: NO), the CPU 11 completes the processing of this intrusion detection system.

After storing the address of the retrieved call instruction, the CPU 11 moves to the address of the call destination specified by the call instruction (step S24), and reads one byte of data (step S25).

Next, the CPU 11 judges whether or not the read data is a push instruction to store an address in a stack (step S26). If the read data is a push instruction (S26: YES), the CPU 11 stores the current address (step S27) and returns the processing to step S25.

If the read data is not a push instruction (S26: NO), then the CPU 11 judges whether or not the read data is a pop instruction (step S28). If the read data is not a pop instruction (S28: NO), the CPU 11 judges whether or not the routine of the call destination has been completed (step S31).

If the routine of the call destination has not been completed (S31: NO), the CPU 11 returns the processing to step S25, or if the routine of the call destination has been completed (S31: YES), the CPU 11 refers to the address stored at step S23, and moves to the next address of the call origin (step S32) to retrieve a call instruction again.

If the data read at step S25 is a pop instruction (S28: YES), the CPU 11 refers to the address stored at step S27, and judges whether or not the read data is a pop instruction with no preceding push instruction (step S29). If the read data is not a pop instruction with no preceding push instruction (S29: NO), the CPU 11 moves the processing to step S31.

If the read data is a pop instruction with no preceding push instruction (S29: YES), then the CPU 11 generates information indicating that malicious code was detected (step S30).

Similarly to Embodiment 1, the information indicating that malicious code was detected may be displayed by providing the relay device 10 with a display unit such as a liquid crystal display, or may be notified by providing the relay device 10 with a warning section such as a buzzer or an LED lamp. Further, the information may be sent to the information processor 20 and displayed on the display unit (not shown) of the information processor 20. In addition, it may also be possible to cut off the communication in response to the creation of the information indicating that malicious code was detected.

Embodiment 3

The above-described embodiments explain a mode in which the present invention is applied to a relay device used for data communications, such as a router, a switch and a broadband router, but it may also be possible to apply the present invention to information processors with communication functions, such as personal computers, servers, mobile phones and PDA.

Figure 9:
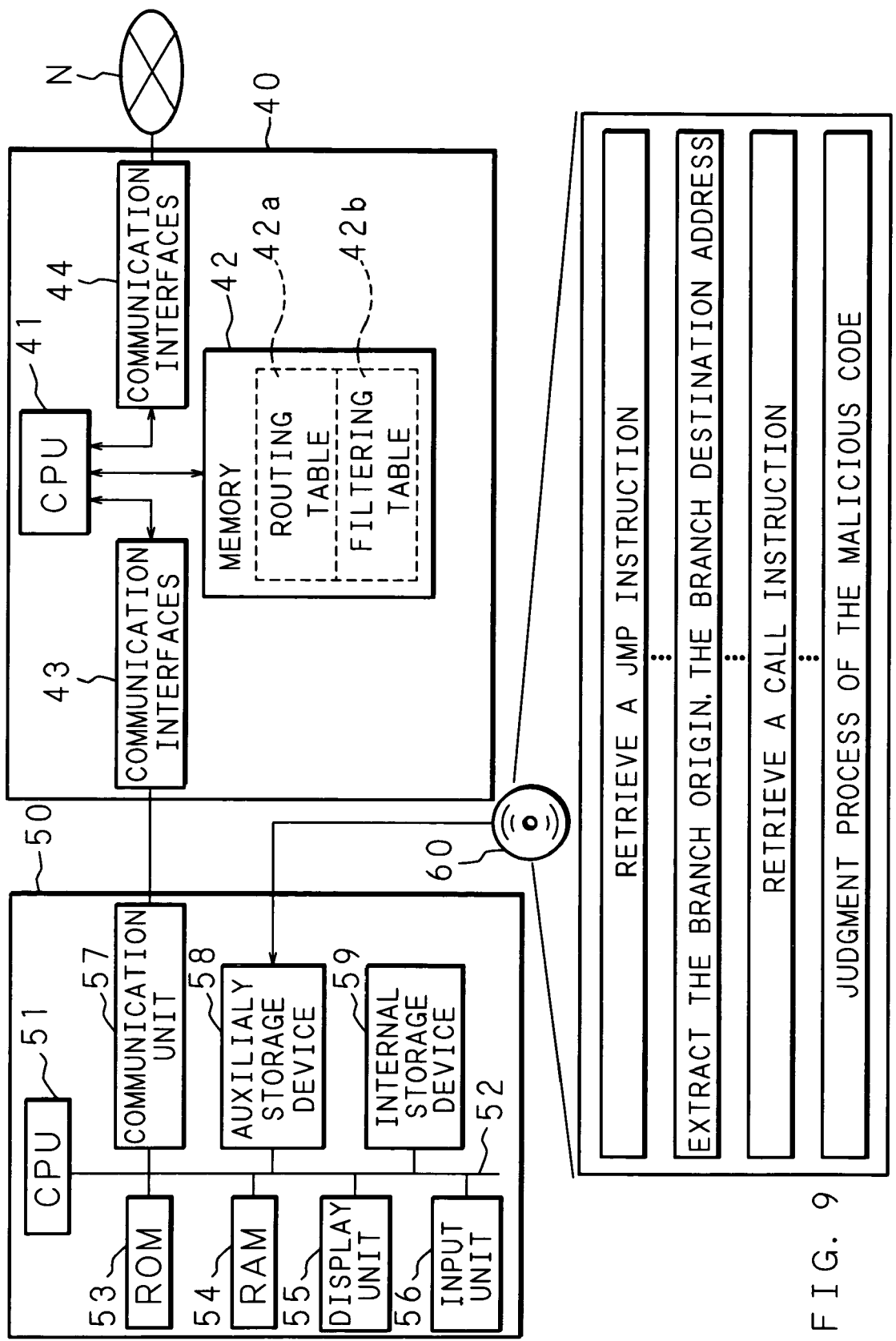
FIG. 9 is a schematic view for explaining the structure of an intrusion detection system according to an embodiment.

FIG. 9 is a schematic view for explaining the structure of an intrusion detection system according to this embodiment. In FIG. 9, the reference numeral 50 represents an information processor such as a personal computer, and the information processor 50 is connected to a data communication network N through a relay device 40 such as a router. The information processor 50 receives data from various types of communication equipment and other information processor through the data communication network N and the relay device 40, and also sends data to the communication equipment and information processor.

The relay device 40 comprises a CPU 41, a memory 42, and communication interfaces 43 and 44. The memory 42 includes a routing table 42a storing communication route control information, and a filtering table 42b storing identification information (for example, IP addresses or port numbers) of senders to be blocked. When sending data to an external device from the information processor 50, a transmission route is set by the routing table 42a, and when receiving data from an external device, a judgment is made as to whether or not the external device is a sender to be blocked, with reference to the filtering table 42b.

The information processor 50 comprises a CPU 51, and is connected through a bus 52 to various hardware devices, such as a ROM 53, a RAM 54, a display unit 55, an input unit 56, a communication unit 57, an auxiliary storage device 58, and an internal storage device 59. The CPU 51 controls these hardware devices according to a control program stored in the ROM 53. The RAM 54 is composed of an SRAM or a flash memory, and stores data generated during execution of the control program stored in the ROM 53.

The display unit 55 is a display device such as a CRT and a liquid crystal display, and the input unit 56 is an input device such as a keyboard and a mouse. The display unit 55 and the input unit 56 are used, for example, for inputting and displaying data to be sent. The communication unit 57 comprises circuit terminating equipment such as a modem, and controls the sending and receiving of various data through the relay device 40.

The auxiliary storage device 58 is composed of an FD drive, a CD-ROM drive, etc. for reading the computer program of the present invention and data from a memory product 60 such as a FD and a CD-ROM, and the read computer program and data are stored in the internal storage device 59. The computer program and data stored in the internal storage device 59 are read into the RAM 54 and executed by the CPU 51, thereby functioning as the information processor 50 of this embodiment.

Of course, the computer program of the present invention may be provided by not only the memory product 60, but also the data communication network N.

The above-mentioned computer program is preferably a fixed program that is automatically read into the RAM 54 when the information processor 50 is booted, and designed to automatically perform detection of malicious code when the communication unit 57 receives data from an external device. Since the procedure for detecting malicious code is the same as in Embodiments 1 and 2, the explanation thereof is omitted.

In this embodiment, data containing malicious code is detected using the information processor 50 such as a personal computer, but, of course, the present invention is also applicable to mobile phones, PDA, computer game machines, communication devices for vehicles, and various information home electronics as well as personal computers.

Moreover, by providing the computer program of the present invention by recording it on a memory product such as an FD and a CD-ROM, it is possible to provide the computer program as an application software package for detecting computer viruses.

INDUSTRIAL APPLICABILITY

As described in detail above, the present invention retrieves an instruction code related to a branch instruction from input data, stores a branch origin address and a branch destination address of the retrieved instruction code, judges whether or not an instruction code for calling an instruction code group for executing a predetermined process is associated with the branch destination address, stores the address of the call destination of the instruction code if the instruction code is associated with the branch destination address, and judges whether or not the stored address of the call destination is between the branch origin address and the branch destination address. Thus, since the present invention pays attention to universal structures which are not seen in usual execution code, even when malicious code is modified, there is a high possibility that the modified malicious code will be detected, and even when unknown attack data appears, it is possible to find the malicious code unless the substantial process of malicious code is changed. Moreover, since a judgment as to whether or not data is malicious code can be made by consecutively reading instruction codes, the processing speed is fast, and, for example, it is possible to judge data received by communication in real time.

Besides, since the present invention further comprises means for judging whether or not a predetermined character string is associated with a return address of the instruction code group, the malicious code detection accuracy is improved.

In addition, since the present invention retrieves an instruction code for calling an instruction code group for executing a predetermined process from input data and judges whether or not a predetermined character string is associated with a return address of the instruction code group, it is possible to easily and accurately judge whether or not the data is malicious code.

Further, since the present invention retrieves an instruction code for calling an instruction code group for executing a predetermined process from input data and judges whether or not an instruction code for obtaining a return address is contained in the instruction code group if the instruction code is retrieved, it has advantageous effects, such as it is possible to easily and accurately judge whether or not the data is malicious code.

The invention claimed is:

1. A data processing method including receiving input data containing a plurality of instruction codes, and judging whether or not a process executed based on the instruction codes contained in the received data is a malicious process, said method comprising:
- sequentially reading, using a processor, one byte of the input data at a time;
- determining, using a processor, whether or not the read data is a branch instruction;
- when the read input data is a branch instruction, determining whether a branch destination address of the branch instruction is larger than a branch origin address based only on the one byte of the data read and storing the branch destination address and branch origin address, when the branch destination address is determined to be larger than the branch origin address;
- determining, using a processor, whether or not there is a call instruction at the branch destination address, and storing a call destination address of the call instruction when the instruction code at the branch destination address is a call instruction;
- determining, using a processor, whether or not the stored call destination address is between the branch origin address and the branch destination address; and
- when the stored call destination address is between the branch origin address and the branch destination address concluding that the input data includes a malicious process.

2. A data processor including means for receiving input data containing a plurality of instruction codes, for determining whether or not a process executed based on the instruction codes contained in the received data is a malicious process, said data processor comprising:
- means for sequentially reading one byte of the input data at a time;
- means for determining whether the read data is a branch instruction;
- when the read input data is a branch instruction, determining whether a branch destination address of the branch instruction is larger than a branch origin address based only on the one byte of the data read and storing the branch destination address and the branch origin address when the branch destination address is determined to be larger than the branch origin address;
- means for determining whether or not there is a call instruction at the branch destination address, and storing a call destination address of the call instruction when the instruction code at the branch destination address is a call instruction; and
- means for determining whether or not the stored call destination address is between the branch origin address and the branch destination address; and
- when the stored call destination address is between the branch origin address and the branch destination address concluding that the input data includes a malicious process.

3. The data processor as set forth in claim 2, further comprising means for judging whether or not a predetermined character string is associated with a return address of an instruction code group called by the call instruction, wherein when the predetermined character string is associated with the return address, the information indicating that the data is data for executing a malicious process is outputted.

4. A non-transitory computer-readable memory having stored thereon a computer program that causes a computer to judge whether or not a process executed based on input data containing a plurality of instruction codes is a malicious process, the stored computer program comprising code for causing a processor to:
- sequentially read one byte of the input data at a time;
- determine whether or not the read data is a branch instruction;
- determine whether a branch destination address of the branch instruction is larger than a branch origin address based only on the one byte of the data read, when the read input data is determined to be a branch instruction, and store the branch destination address and branch origin address when the branch destination is determined to be larger than the branch origin address;
- determine whether or not there is a call instruction at the branch destination address and to store a call destination address of the call instruction when the instruction code at the branch destination address is a call instruction;
- determine whether or not the stored call destination address is between the branch origin address and the branch destination address; and
- conclude that the input data includes a malicious process when the stored call destination address is determined to be between the branch origin address and the branch destination address.

5. A data processor comprising:
- an input unit for inputting data containing a plurality of instruction codes;
- a storing unit for storing the data input by the input unit; and
- a controller capable of performing operations of;
  - sequentially reading one byte of the input data at a time;
  - determining whether or not the read data is a branch instruction;
  - when the read data is a branch instruction determining whether a branch destination address of the branch instruction is larger than a branch origin address based only on the one byte of the data read, and storing the branch destination address and branch origin address when the branch destination address is determined to be larger than the branch origin address;
  - determining whether or not there is a call instruction at the branch destination address and storing a call destination address of the call instruction in the storing unit when the instruction code at the branch destination address is a call instruction;

determining whether or not the stored call destination address is between the branch origin address and the branch destination address; and when the stored call destination address is between the branch origin address and the branch destination address concluding that the input data includes a malicious process.

6. The data processing method according to claim 1, wherein the malicious process causes an erroneous operation in the process executed based on the instruction codes contained in the received data.

* * * * *